(12) United States Patent
Nash

(10) Patent No.: US 10,859,066 B2
(45) Date of Patent: Dec. 8, 2020

(54) SUB-TERRANEAN UPDRAFT TOWER (STUT) POWER GENERATOR

(71) Applicant: Rodney Nash, Novato, CA (US)

(72) Inventor: Rodney Nash, Novato, CA (US)

(73) Assignee: PowerSILO Inc., Novato, CA (US)

( * ) Notice: Subject to any disclaimer, the term of this patent is extended or adjusted under 35 U.S.C. 154(b) by 0 days.

(21) Appl. No.: 14/706,845

(22) Filed: May 7, 2015

(65) Prior Publication Data

US 2017/0257006 A1 Sep. 7, 2017

Related U.S. Application Data

(60) Provisional application No. 61/989,730, filed on May 7, 2014.

(51) Int. Cl.
*H02K 7/18* (2006.01)
*F03D 9/35* (2016.01)

(52) U.S. Cl.
CPC .............. *F03D 9/35* (2016.05); *Y02E 10/728* (2013.01)

(58) Field of Classification Search
CPC ........ H02K 7/1823; F03D 9/35; Y02E 10/728
USPC .......................................................... 290/52
See application file for complete search history.

(56) References Cited

U.S. PATENT DOCUMENTS

| | | | | |
|---|---|---|---|---|
| 4,121,566 A | * | 10/1978 | Radenkovic | F24D 3/005 126/585 |
| 7,798,684 B2 | * | 9/2010 | Boissevain | F21V 29/773 362/431 |
| 8,207,625 B1 | * | 6/2012 | Cristo | F03D 9/25 290/55 |
| 9,404,392 B2 | * | 8/2016 | Kare | F01K 11/00 |
| 2006/0156725 A1 | * | 7/2006 | Kenessey | F03G 6/045 60/641.12 |
| 2011/0074164 A1 | * | 3/2011 | Kobayashi | F03D 9/007 290/1 R |
| 2013/0001951 A1 | * | 1/2013 | Tai | F03D 1/04 290/55 |
| 2013/0038068 A1 | * | 2/2013 | Tai | F03D 3/04 290/55 |
| 2013/0168965 A1 | * | 7/2013 | Yocum, Jr. | F03B 13/02 290/52 |

(Continued)

*Primary Examiner* — Sean Gugger
(74) *Attorney, Agent, or Firm* — Silver Legal LLC; Jarrett L. Silver

(57) ABSTRACT

A Sub-Terrestrial Updraft Tower-STUT, combination subsurface Downdraft/Updraft Tower, comprising an Inner Updraft Shaft and Outer Downdraft Shaft, housing the Inner Updraft Shaft, receiving air flow from air-inlets at surface level into Outer Downdraft Shaft. Upon reaching the bottom of the Outer Downdraft Shaft, air flow reverses in direction, inward and upward, into the Inner Updraft Shaft. Volumetric Displacement or airflow is induced and sustained via the injection of air and heat into the Downdraft/Updraft respectively; driving a plurality of sustained system pressure biases, and fed by temperature differentials that are initiated, sustained, and enhanced due to the configuration, orientations and functions of numerous STUT elements; creating coherent, accelerated airflow to pass through/within a ringed shaped, diverging converging Vertical Axis Vertical Airflow Nozzle and Turbine—VAVANT; airflow causes rotation of VAVANT, and summation of torque forces at VAVANT hub, shaft, gearbox, and power head, generate EMF, and electrical power.

20 Claims, 13 Drawing Sheets

STUT Functional Diagram

(56) References Cited

U.S. PATENT DOCUMENTS

| | | | | |
|---|---|---|---|---|
| 2014/0174086 A1* | 6/2014 | Kare | .................. | F01K 11/00 |
| | | | | 60/670 |
| 2015/0337676 A1* | 11/2015 | Feng | .................. | F01D 15/10 |
| | | | | 290/52 |
| 2016/0186725 A1* | 6/2016 | Dofredo | .................. | F03D 9/39 |
| | | | | 60/641.12 |
| 2016/0298612 A1* | 10/2016 | Bohl | .................. | F03G 6/04 |
| 2016/0333748 A1* | 11/2016 | Rudowicz | .................. | F01K 27/005 |
| 2017/0051717 A1* | 2/2017 | Kim | .................. | B01D 5/0033 |
| 2019/0316563 A1* | 10/2019 | Hyseni | .................. | F03D 9/00 |

\* cited by examiner

Figure 1 - STUT Functional Diagram
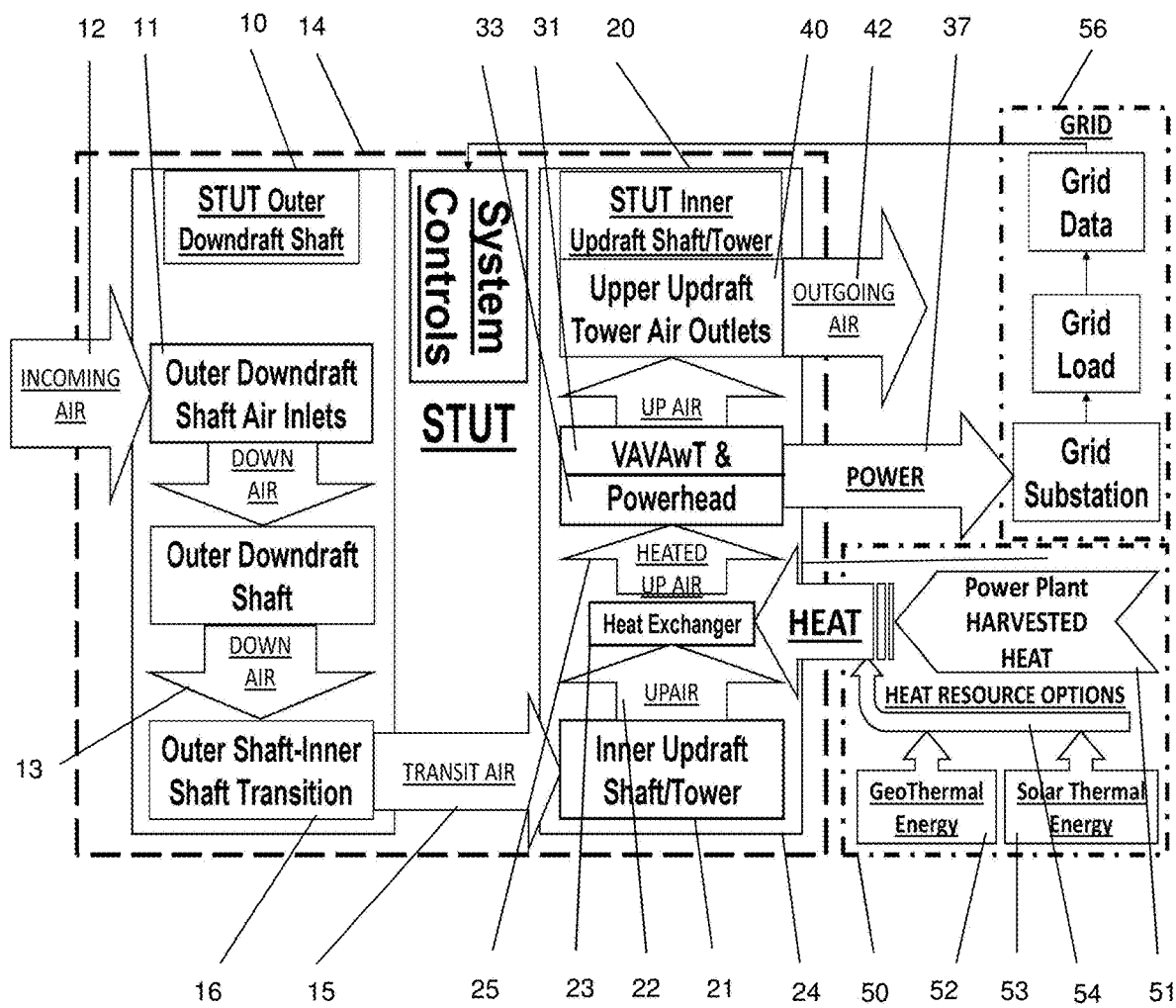

Figure 2 – STUT Process Relative Conditions- Not.To.Scale (N.T.S.) or Proportion.
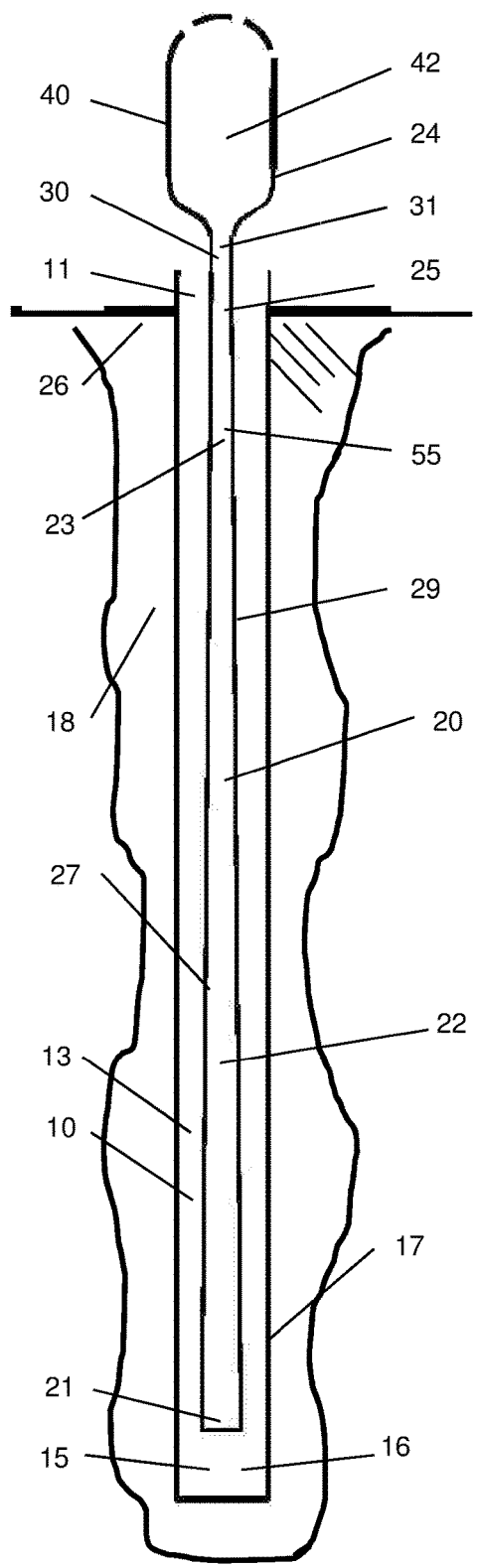

Figure 3 – Axonometric View - (N.T.S.) or Proportion.
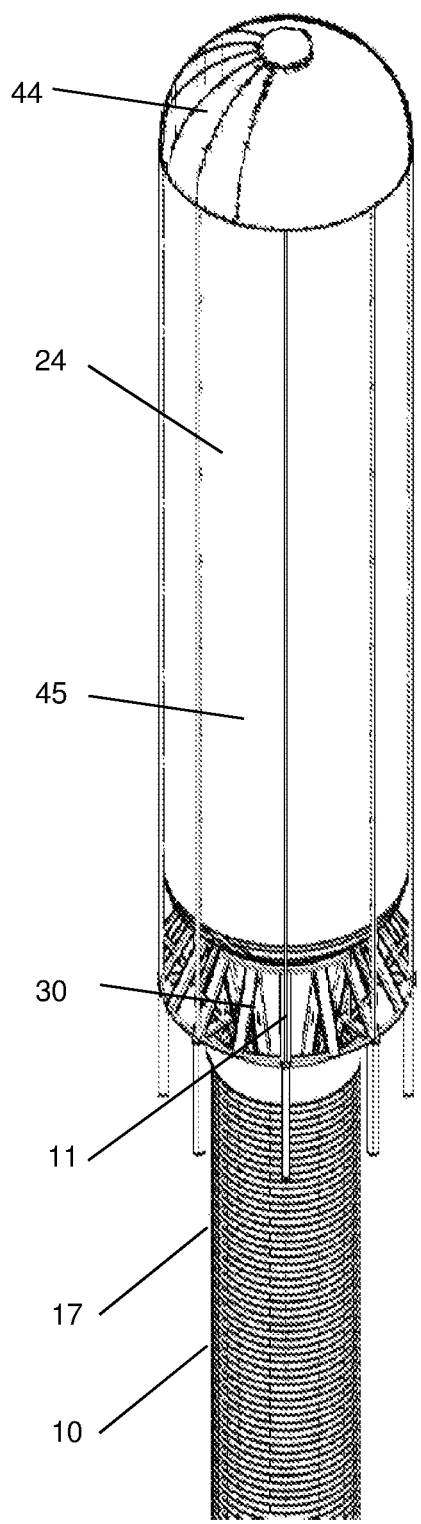

Figure 4 – Full System View Longitudinal Section - (N.T.S.) or Proportion.
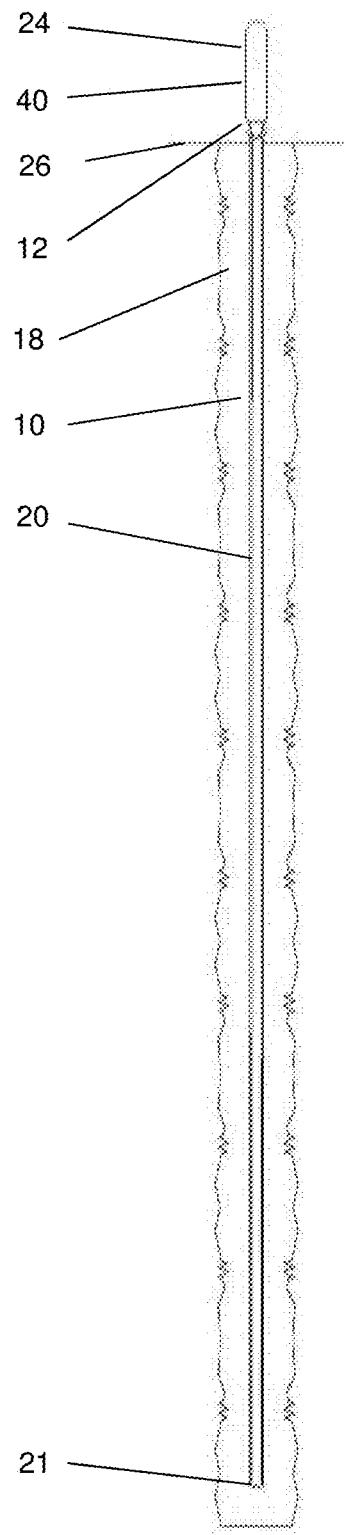

Figure 5 – Elevation - (N.T.S.) or Proportion.
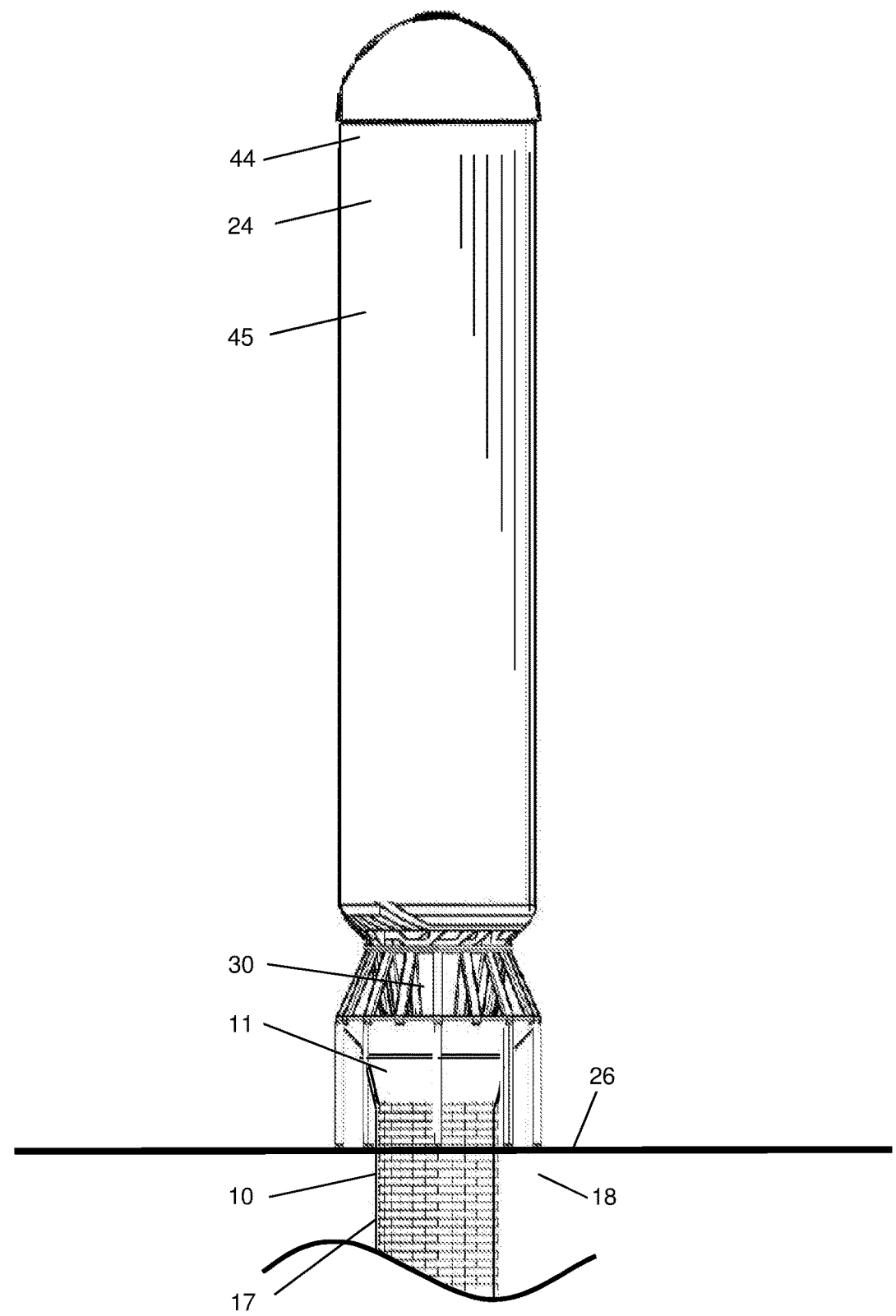

Figure 6 - Top View - (N.T.S.) or Proportion.
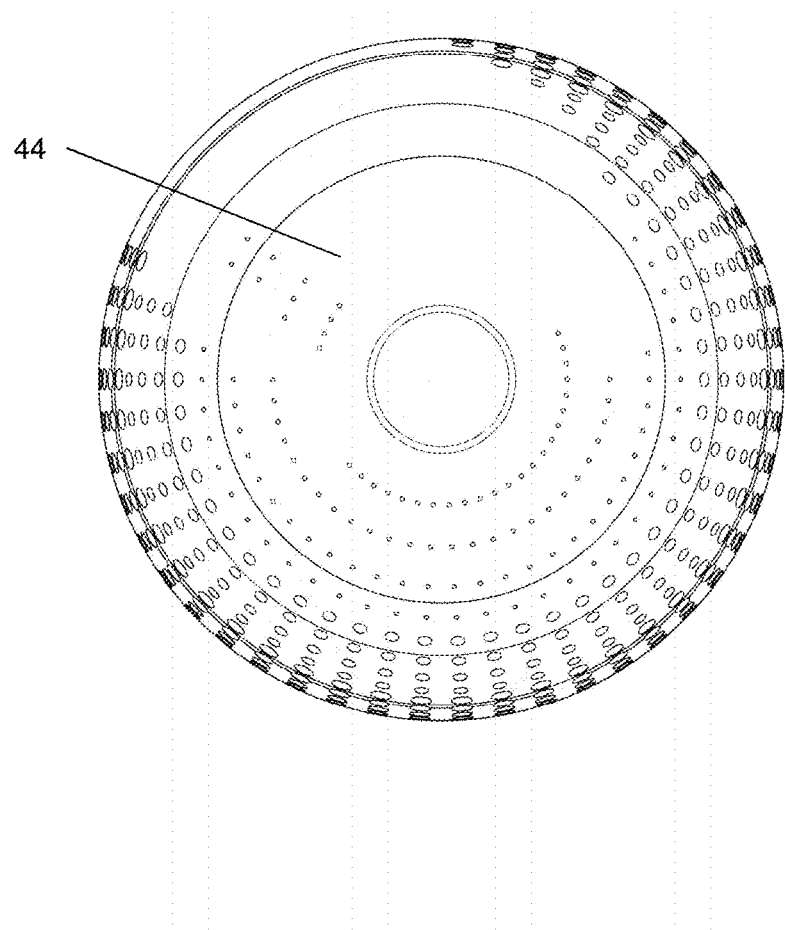

Figure 7 – Longitudinal Section - (N.T.S.) or Proportion.
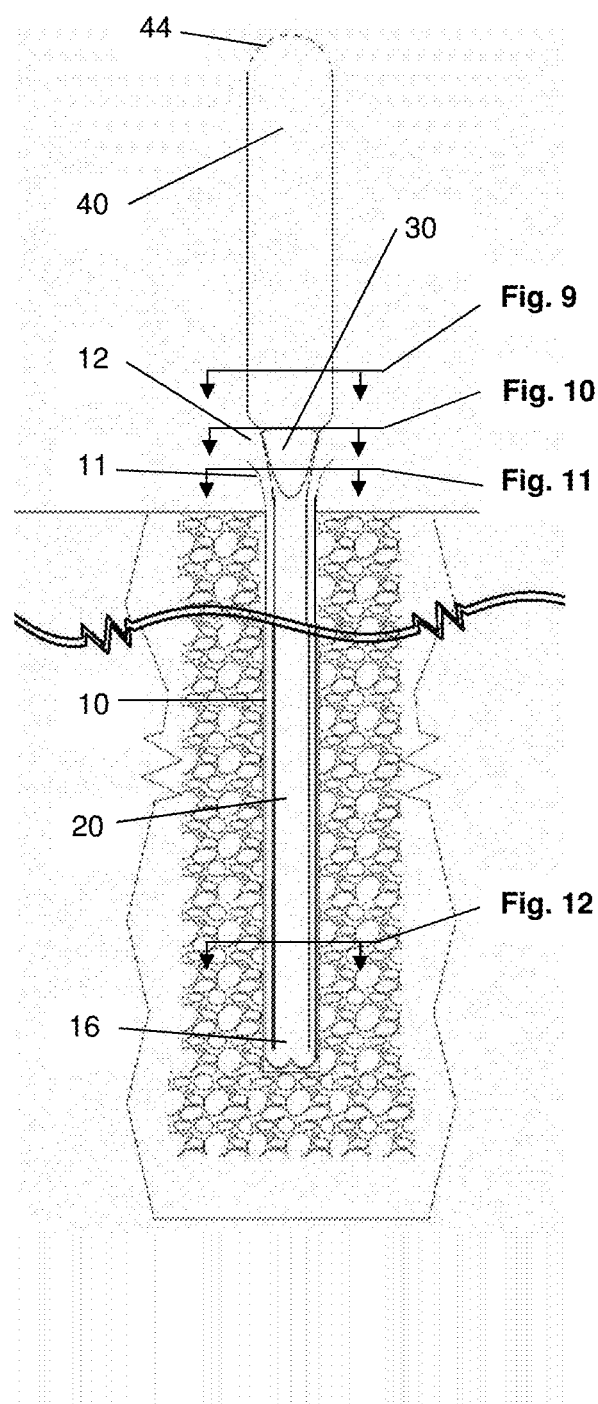

Figure 8 – Enlarged Latitudinal Section – Upper Shaft - (N. T.S.) or Proportion.
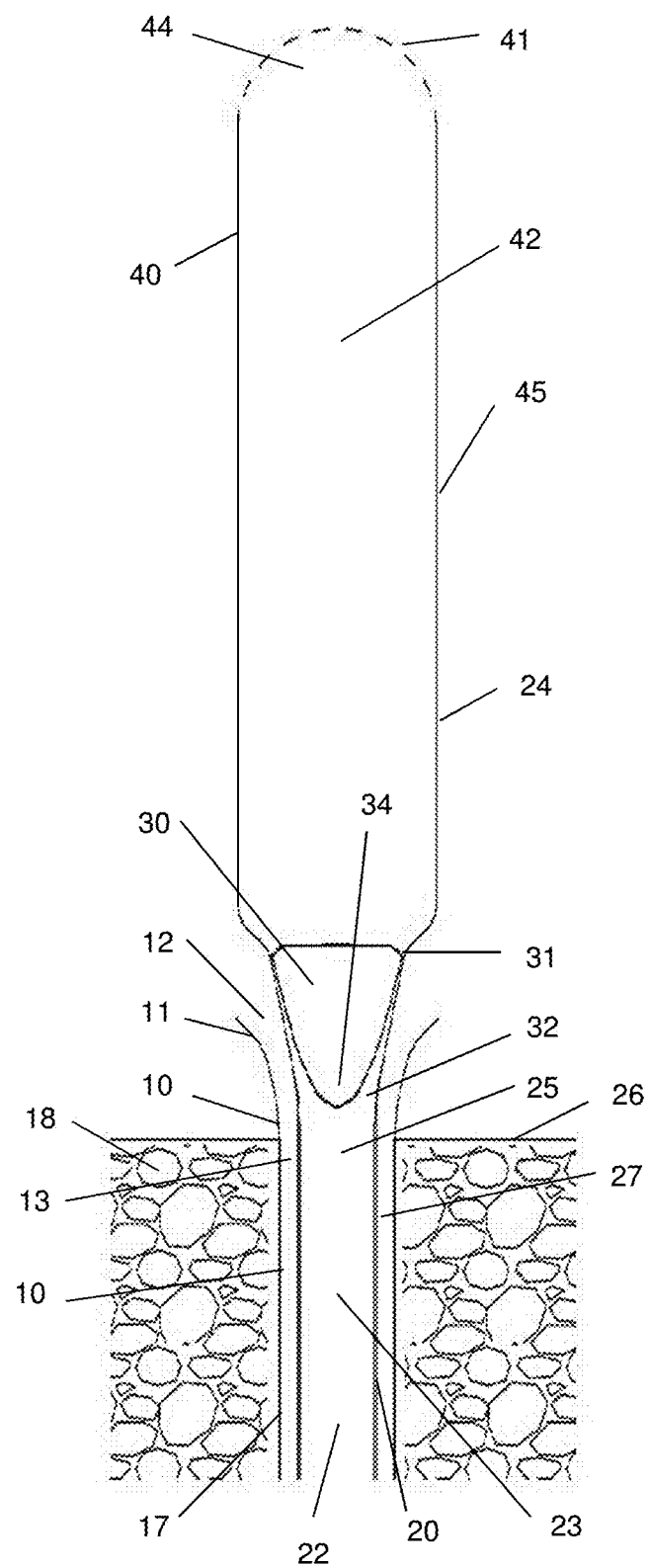

Figure 9 – Enlarged Latitudinal Section – Upper Shaft - (N.T.S.) or Proportion.
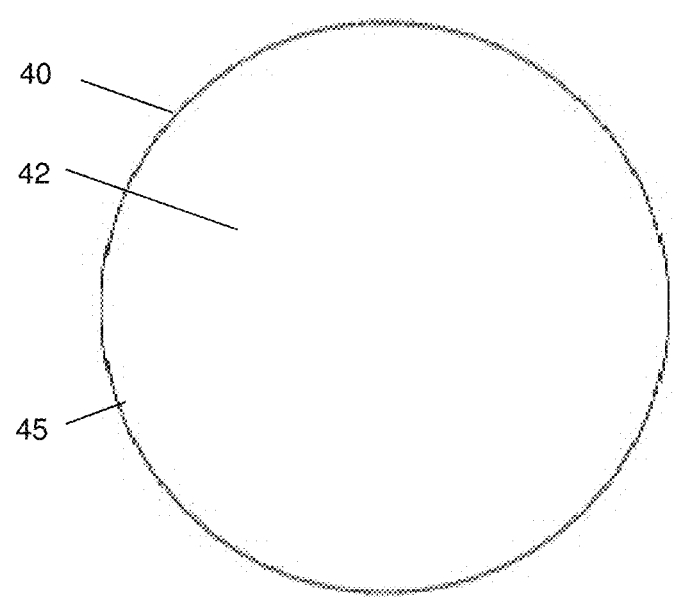

Figure 10 - Latitudinal Section - Nozzle & VAVANT - (N.T.S.) or Proportion.
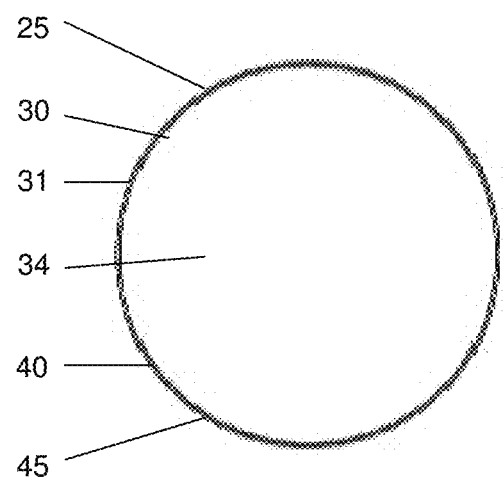

Figure 11 – Latitudinal Section – Downdraft Air Intake & Inner Updraft Shaft 20 w/Nozzle - (N.T.S.) or Proportion.
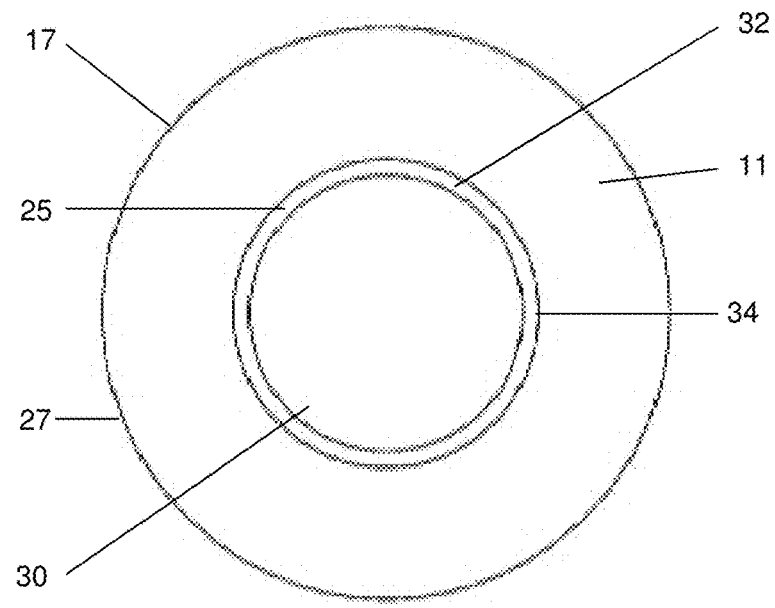

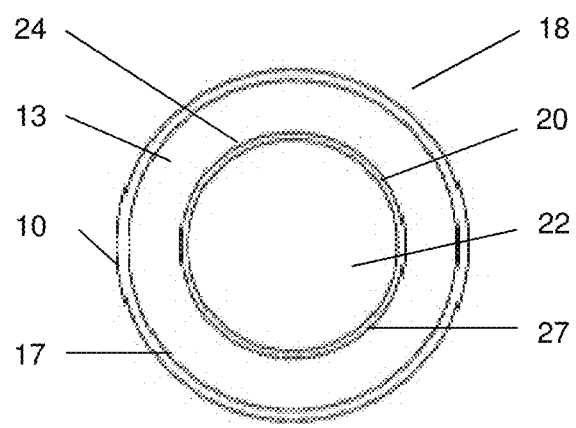
Figure 12 – Latitudinal Section – Downdraft/Updraft shaft 20- (N.T.S.) or Proportion.

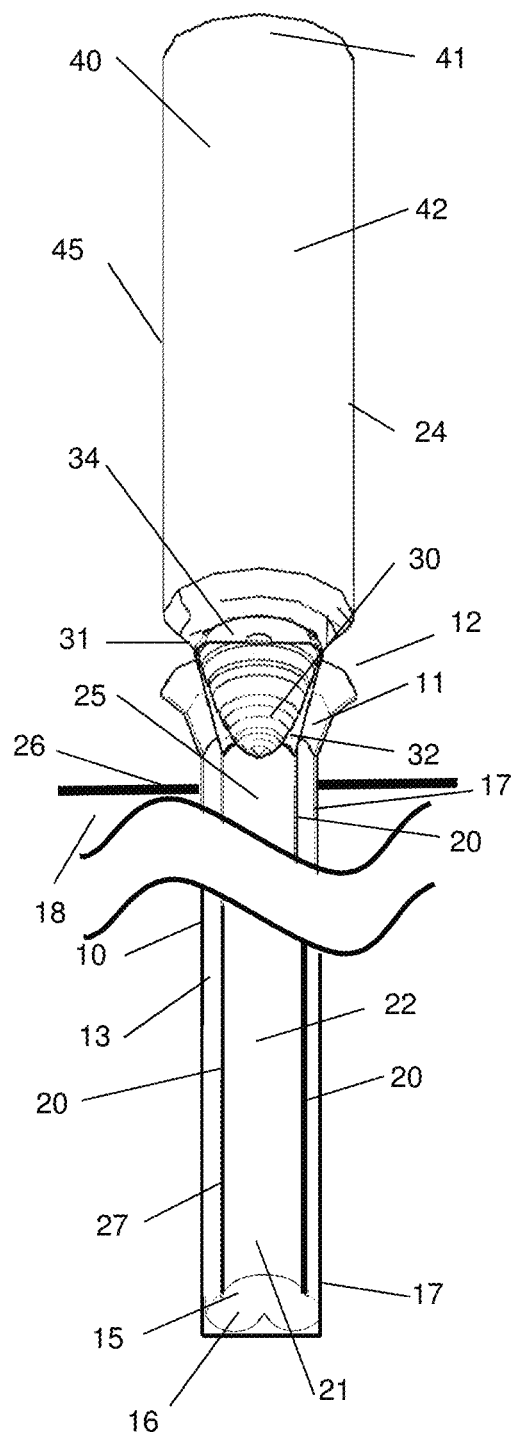
Figure 13 - Longitudinal Axonometric Section - (N.T.S.) or Proportion.

SUB-TERRANEAN UPDRAFT TOWER (STUT) POWER GENERATOR

CROSS-REFERENCE OF RELATED APPLICATION

This is a utility application based upon U.S. patent application Ser. No. 61/989,730 filed on May 7, 2014. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

FIELD OF THE INVENTION

The invention generally relates to subterranean tower power generator systems. More particularly, the invention relates to means and methods of incorporating the combination of updraft and downdraft shafts while utilizing the Energy Harvesting of thermoelectric power plants.

DESCRIPTION OF THE RELATED ART

| | | |
|---|---|---|
| 3927659 | December 1975 | Blake |
| 3976508 | November 1978 | Mlavsky |
| 4044753 | August 1977 | Fletcher |
| 4121566 | October 1978 | Radenkovic |
| 4137899 | February 1979 | Weslow |
| 4146789 | March 1979 | Neale |
| 4209007 | June 1980 | Collins |
| D288593 | March 1987 | Campbell |
| D311516 | October 1990 | Geisler, Jr. |
| D425013 | May 2000 | Lai |
| 6363928 | April 2002 | Anderson, Jr. |
| 6384320 | May 2002 | Chen |
| 6717045 | April 2004 | Chen |
| D543500 | May 2007 | Parness et al. |

BACKGROUND OF THE INVENTION

Traditional fossil fuel electrical power generation is inefficient, not sustainable, and based on finite, nonrenewable fuel supplies that are, due to the chemical process used to render heat from these fuels, produce pollution and are harmful to the human environment. Power utility systems require the installation and maintenance of vast fuel supply, transmission, and distribution infrastructure. Because of the fundamental hierarchy and organization of the existing power generation and transmission systems, i.e., centrally located electrical resources and multiple, remotely located users or loads, changes or modifications to the system are too expensive, and cost prohibitive for the integration and eventual conversion of existing fossil fuel power infrastructure, toward classical unreliable, renewable, distributed generation technologies.

Traditional fossil fuel electrical power generation assets remain in operation, and are increasing in actual total power generation, due to the unreliable nature and increased deployment of classic (i.e., wind and solar) renewable power. The original designers of this existing generation and distribution system did not anticipate the quantity and scale of changes that would stress this system, threatening to make it outdated and possibly obsolete.

Renewable power resources in distributed, or decentralized generation development, are challenged by technical, regulatory, political, social, environmental, and economic factors as well. These and other development considerations will continue to make the adoption and deployment of classic renewable energy technology less successful because of the quality and characteristics of their adaptability, accessibility, affordability, and applicability. Increasing the total generation capacity of existing power utility infrastructure by increasing the overall efficiency of traditional power generation systems; and transforming the quality and sustainability of that generation by reducing the pollution emission produced based on sustainable resources, with a power technology that enables a hybrid power generation retrofit of those existing power infrastructure assets (from a controllable, renewable emission free generation process), is a focus of this invention.

Within the electrical power generation industry segment of alternative power generation, Solar Tower & Solar Updraft Towers have begun to be considered as potential options for renewable power generation, but have several development hurdles to overcome. The classic SUT is an extremely tall tower and if built would be one of the tallest and largest structures on Earth. Existing Updraft Tower technology in the form of Solar Tower-ST, Solar Updraft Tower-SUT, and Down Draft Tower's —DDT, are in development and propose to provide emission-free utility-scale power. However, these Solar Tower-ST, Solar Updraft Tower-SUT systems remain dependent on the solar thermal gain to drive system temperature and pressure differentials, or in the case of Down Draft Tower's, need large amounts of water, and large land mass resources.

An analysis of the adaptability, accessibility, applicability, and affordability concerns of these technologies lead to limited development potentials of these applications due to their size factors; as well as technical, regulatory, political, social, environmental, and economic challenges. These given circumstances means that though emission free, these platforms are dependent on climate, weather, and sun cycles to perform optimally.

The known art related to solar updraft towers, downdraft towers, and the classic renewables of Solar and Wind Power for power generation, does not provide integration with existing power generation infrastructure; such as an option for dry cooling, or the utilization of Energy Harvesting to provide hybridization retrofit configuration options. This means that the path to a full zero emission industry solution offered by wind and solar, requires a total replacement of (not integration with) the existing generation technology, and associated infrastructure, in order to achieve 100% zero emissions within the electrical power generation industry. Due to the very low capacity factors of classic wind and solar technology, a very large critical mass of wind and solar will need to be developed and installed, prior to turning off existing traditional fuel power plants. Existing classic renewables fail to provide a practical, reliable, and predictable means of controlling clean energy resources to generate reliable, base-load electrical emissions-free power.

A review of the technical performance and functions of the classic Utility Scale Solar Power reveals severe limitations to address base-load generation operations, and will need a potential storage option to begin to address this operation deficiency; based on its need for daily access to the solar energy. A review of the technical performance and functions of the classic Utility Scale Horizontal Axis Wind Turbine (HAWT) reveals some fundamental differences in its performance profile, and the performance profile of ST/SUT updraft towers, and the subject of this invention. HAWT Power Technology uses large diameter rotors blades to harness organic wind energy. HAWT are designed to work across a wide range of air velocities. Within the HAWT System, the largest amount or volume of wind energy to power conversion occurs in the outer +/−20% radius of rotor length; the tip, not hub, root, & span swept area, due to the cross-sectional area of this region. This outer cross-sectional area performance ring is approximately 40% of the HAWT Swept Area. HAWT lift is in direction of rotation (nearly perpendicular to airflow) to turn hub/shaft, gearbox and powerhead. HAWTs are dependent on organic airflow, which varies with and are dependent on weather, seasons, geography, etc. HAWT Wind Farms use large land mass thus, is not adaptable, and has negative impacts on environment and human inhabitants. HAWT operates at with approximately 30-40% capacity factor, and thus is unreliable, not controllable, and not applicable for base-load power generation operations. An analysis of HAWT Technology potential viability, and feasibility reveals that there are not enough locations of potentially developable locations for wind power to solve existing power needs or future load growth.

ST/SUT Power Technology uses solar thermal gain from a large diameter ground-based collector/canopy, and a turbine or group of turbines at the base of the tower, to harness solar radiation, to create airflow and harness wind energy. ST/SUT creates a higher temp buoyant air mass under the canopy; and a relatively higher pressure air mass near the center of the canopy. ST/SUT uses a pressure differential between surface & high altitude at the top of the tower, driven by thermal gain. The air mass of relatively higher pressure moves into the low-pressure zone within the tower. The turbine is at the base of the tower and center of the canopy; the system airflow chokes point. Warm airflow moving through the choke point turns the turbine/s, gearbox, etc., thus producing electrical power. ST/SUT does have the ability to produce baseload power, and is a very large system, requiring a vast land mass. Also, it is very tall, which makes it very expensive to build and operate. Analysis of the ST/SUT platform performance reveals that while being applicable, it also possesses accessibility, adaptability, and affordability deficiencies.

A power generation technology that provides a solution that resolves these issues identified, as well as other outstanding concerns here, would have significant national security, and national and international economic implications. Water & energy are integral for national, economic & environmental security. The existing technologies are 100% dependent on the organic means of sun and wind, and are thus unreliable and uncontrollable. The current technology requires the placement of wind turbines where the wind resource is most abundant. However there is a significant limitation on the energy density and adaptability of this technology. Additionally, large solar farms and the largest wind turbines technology are not conducive to installation near urban areas where renewable power is needed. Cities are usually not in the location where the electricity that is generated is needed. Often the wind power resources that are most available or accessible, and reliable are in very remote areas, i.e. open ocean; which requires additional capital expenditures on infrastructure development, which increases the development and operation costs of the wind resource.

A Power Plant Hybrid configuration is the most reliable, incremental, feasible option for establishing and maintaining energy independence; and as a resource pathway for the stable, responsible electrical power generation industry transition away from fossil fuels, within the relatively short window of time desired by most energy plans, environmental strategies, and regulations scheme. The technology that is the subject of this invention is an economical and feasible alternative to existing classic renewable technologies and traditional fossil fuel power generation. The need to develop and maintain a native electrical power generation resource that is unlimited, widely and readily available, economical, affordable, base-load capable, applicable, highly reliable, safe, clean, sustainable, controllable, accessible, is included in the basis for this invention.

SUMMARY OF THE INVENTION

The process (or processes) that is the subject of this invention makes Sub-Terrestrial Updraft Tower-STUT a utility scale emissions free, base-load energy harvesting power generation technology that is:
 a. Available—Because it is Predictable, Forecastable, Reliable
 b. Accessible—Controllable, High Capacity Factor
 c. Affordable—Simple Design, Material, & Durable Construction
 d. Applicable—Emission Free, Base Load Capable, Renewable, Adaptable STUT Power Generation uses Energy Harvesting of a thermoelectric power plant to create a Hybrid Power Plant, that produces electrical power from a traditional fuel based Rankine Cycle Process, and also from its recycled waste heat, not exhaust heat. STUT dramatically increases the overall power plant's efficiency and reduces pollution emissions of the thermoelectric power plant. Power generation is achieved with other Ubiquitous Renewable Heat Sources such as Geothermal Hot Dry Rock or Solar Thermal Gain in a stand-alone configuration. The controlled and enhanced flow of air into a downdraft shaft, with the airflow enhancements of the STUT inner updraft tower along with the injection of heat, along with the nozzled turbine and other unstated innovations; all combine to make the STUT a unique power generation technology that solves all previous technical problems identified with classic renewable technologies. These benefits are achieved while also serving as the first of its kind, viable base-load, zero emissions solution for existing fossil fuel power generation infrastructure; enabling hybrid power generation, and the power industry's transition toward fully zero emission power generation.

Additionally, STUT provides conservation of water in thermoelectric power plants; reductions in fuel consumption, fuel costs, & associated pollution emissions by increases overall energy efficiency based on STUT Power Plant Hybridization Configuration. STUT provides dry cooling on a retrofit & new construction basis by recycling or energy harvesting thermoelectric power plant condensation loop heat, not exhaust heat, to create & sustain vertical air flow within a deep double walled subterranean updraft shaft/tower, across a Vertical Airflow, Vertical Axis Turbine; producing power & reducing the use of water for thermoelectric cooling.

In accordance with the invention, there is provided a process that includes a Sub-Terrestrial Updraft Tower-STUT; which is a unique, combination Downdraft/Updraft Tower process that generates electrical power from the volumetric displacements of air or other gases; driven by a plurality of sustained system pressure biases, and fed by temperature differentials that are initiated, sustained, and enhanced due to the configuration and orientations of the functions of numerous STUT process elements. The STUT process includes an Inner Updraft Shaft vertical air shaft with nested Vertical Axis Vertical Airflow Nozzle and Turbine, a unique VAVANT Airflow Turbine Assembly. The Inner Updraft Shaft is oriented and housed within a deep, sub-terrestrial Outer Downdraft Shaft which receives low-velocity air flow from outer air-inlets located at or near ground surface level; with airflow downward into a deep Outer Downdraft Shaft.

Once reaching the bottom of the Outer Downdraft Shaft, air flow reverses in direction, inward and upward, into the inlet of the Inner Updraft Shaft of the STUT. The STUT airflow is induced and sustained via the injection of air into the Outer Downdraft Shaft, and heat into the contoured Inner Updraft Shaft of the STUT, which creates a coherent and accelerated airflow; and approaches the contoured Vertical Axis Vertical Airflow Nozzle and Turbine—VAVANT Airflow Turbine with relatively increased pressure and velocity; causing divergent-convergent airflow to pass through and within the contoured nozzle, and across the VAVANT Airflow Turbine with high velocity and mass flow rate. The accelerated airflow causes rotation of the VAVANT Airflow Turbine, and the summation of torque forces present at the VAVANT Airflow Turbine hub and perimeter, attached gearing, and power head, thus generating EMF and electrical power. The process of gathering, collecting, controlling, aligning, orienting, conditioning, accelerating, transferring available heat into the airstream, optimizing exergy, and harnessing power from this STUT technology is the focus and accomplishment of this invention.

The Subterranean Updraft Tower-STUT produces emissions-free, base load power by Energy Harvesting the waste heat or cooling cycle heat (not exhaust heat) generated from new or existing thermoelectric power plants; or Solar/Geo Thermal Heat, or industrial process waste heat resources. More specifically, the invention relates to means and methods of generating clean, reliable power within a combination subgrade or sub-terrestrial downdraft/updraft tower by harvesting process heat, waste heat, or renewable organic heat resources. Unlike thermoelectric power generation systems such as natural gas, coal and nuclear, and Wind/Solar, STUT Power Generation systems can be established in almost any location, either off-grid, remotely, centrally located, or distributed with minimum environmental impact. This favorable impact is due to is very small footprint and lack of dependence on external fuel supply, or natural resources such as wind, sun, water, etc. STUT can be installed in an array format, making it highly scalable, reliable when deployed in an array used alongside thermoelectric power plants; allowing for the thermoelectric power plants configuration of an emission-free hybrid baseload grid power producer. STUT avoids numerous regulatory restrictions associated with traditional renewable energy production resources, site selection, and operations when deployed as a thermoelectric power plant retrofit.

The advantages and accomplishments of this invention include but are not limited to:

- The transition of existing power utility infrastructure to cleaner sustainable power generation technology. STUT is agnostic on source of heat, and thus is perfect for transiting power utility infrastructure away from fossil fuels on a long-term basis;
- Increased renewable power reliability by providing 100% command and control of mass displacement rates that provides airflow based power on a 24/7/365 basis at any urban, industrial, or rural location on earth;
- Small operational footprint, use of Geothermal or Solar Thermal Resources;
- Unaffected by lack of day light, time of day, local weather, or climate conditions;
- Provides a consistent controllable, highly reliable source of clean renewable energy;
- Relatively low costs of development, construction, and costs of operations, on a Levelized Cost of Electricity, LCOE basis, due to very high operational capacity factors;
- No reduction in performance due to operations, lifecycle time, age, environmental or weather conditions, no bug debris, bird strikes, or harm to migratory birds; no flicker or noise pollution;
- Very low, to no net environmental impact compared with classic renewable energy technologies and traditional power plants, especially when installed at the site of an existing thermoelectric power plant as a retrofit.

These and other aspects of the present invention will become apparent upon reading the following detailed description in conjunction with the associated drawings. Other features and advantages of the invention will be apparent from the following description, including the figures, and from the claims presented according to the present invention.

BRIEF DESCRIPTION OF DRAWINGS

The accompanying drawings illustrate a number of preferred embodiments of the invention briefly described here:

FIG. 1 is a block diagram of the STUT sub-terranean updraft tower major functional elements, its links, connections, and resource flows between major internal system elements, and external interfaces, according to the present invention;

FIG. 2 is a schematic diagram of the STUT process relative dynamic system conditions of pressure, temperature, and volume present at ideal control locations within the STUT system during operation, according to the present invention;

FIG. 3 is an axonometric view of STUT system, according to the present invention;

FIG. 4 is a full section longitudinal view of STUT system, above surface and subsurface elements according to the present invention;

FIG. 5 is an above surface elevation of STUT system elements, according to the present invention;

FIG. 6 is a top view of STUT system elements, according to the present invention;

FIG. 7 is a longitudinal section view of STUT system elements, according to the present invention;

FIG. 8 is an enlarged longitudinal section view of STUT system elements, according to the present invention;

FIG. 9 is an enlarged longitudinal section view of upper shaft, according to the present invention;

FIG. 10 is a latitudinal section view of nozzle and VAVANT, according to the present invention;

FIG. 11 is a latitudinal section view of outer downdraft air intake, inner updraft shaft and nozzle and vavant, according to the present invention;

FIG. 12 is a latitudinal section view of downdraft shaft/updraft tower, according to the present invention; and FIG. 13 is a longitudinal axonometric section view of STUT system elements, according to the present invention.

REFERENCE NUMERALS IN THE DRAWINGS

10 STUT outer downdraft shaft
11 outer downdraft shaft air inlets
12 incoming air
13 downward airflow
14 STUT System
15 transit air
16 outer shaft/inner shaft transition or transit zone
17 outer downdraft shaft lining
18 subsurface
20 STUT inner updraft shaft/tower
21 Inner Updraft Shaft Inlet
22 STUT up air flow
23 heat exchanger
24 STUT tower
25 heated up air
26 ground surface level
27 inner updraft shaft lining
30 VAVANT airflow nozzle
31 VAVANT airflow turbine
32 Nested Converging-Diverging Semi-Ovular Nozzle (NCDSO)
33 powerhead
34 Nested Converging-Diverging Semi-Ovular Nozzled
37 power/electrical power output
40 upper updraft tower air outlets
41 STUT Air Discharge vents/location
42 outgoing airflow
44 Upper Shaft vents and cover
45 Upper Updraft Shaft Lining
50 heat
51 power plant harvested heat
52 geothermal hot dry rock
53 solar thermal energy
54 heat resource options
55 injection of air/heat
56 power grid

DETAILED DESCRIPTION OF SPECIFIC EMBODIMENTS OF THE INVENTION

In general, the invention leverages mechanical advantages and functional synergies derived from a combination of laws of physics and engineering principles. The STUT Process uses a deep Outer Downdraft Shaft 10 in the earth, which houses an Inner Updraft Shaft 20, both contained within the subterranean regions of the system. These elements provide the structure that creates the opportunity for the mass displacement of air, to first move or flow downward into the Outer Downdraft Shaft 10, and then upward in the Inner Updraft Shaft 20. The use of a large diameter shaft that is at a lower elevation that surrounding the terrain creates initial thermal sink and cooling of the Outer Downdraft Shaft 10, and a natural or organic relative pressure differential within the STUT System 14, within the Outer Downdraft Shaft 10; as the air inside the shaft, at depth is at a relatively higher pressure than the air that is at ground level, due to the gravity constant.

A plurality of volumetric displacements of air or other gases communicate with other volumetric displacements of air or other gases, are sustained and continuously driven by the plurality of sustained pressure biases within the system. The pressure differential is also sustained and enhanced by temperature differentials that are initiated, sustained, and enhanced based on the orientation and configuration of STUT functional process elements. The STUT process includes an Inner Updraft Shaft 20 vertical air shaft with nozzled turbine assembly, oriented and housed within a deep sub-terrestrial Outer Downdraft Shaft 10, receiving low velocity air flow from outer air-inlets at ground surface level 26, downward into a deep Outer Downdraft Shaft 10. Once reaching the bottom of the Outer Downdraft Shaft 10, air flow reverses in direction, inward and upward, into the inlet of the Inner Updraft Shaft 20 STUT shaft. STUT airflow is induced and sustained via the injection of air and heat 55 into the contoured Inner Updraft Shaft 20 of the STUT, creating coherent, accelerated airflow, that approaches the contoured Vertical Axis Vertical Airflow Nozzle and Turbine—VAVANT Airflow Turbine 31 with relatively increased pressure and velocity; causing divergent, convergent airflow to pass through and within the contoured nozzle, and across the VAVANT Airflow Turbine 31. The summation of pressure biases in the Outer Downdraft Shaft 10, and Inner Updraft Shaft 20 and VAVANT Airflow Nozzle 30 drives accelerated airflow toward the face of the turbine, causing rotation of the VAVANT Airflow Turbine 31, and the summation of torque forces at VAVANT Airflow Turbine 31 hub and perimeter, attached gearing, and power head 33, thus generating EMF and electrical power.

The processes of initiating, inputting, gathering, collecting, controlling, aligning, orienting, conditioning, accelerating, transferring, exchanging, and mixing airflow mass with available heat into the airstream, optimizing exergy, and harnessing converted power from this technology is the focus and accomplishment of this invention. These and the other main STUT elements provide the following processes related to STUT System 14 Organization and Operations, that support or provide beneficial functions and associated features described herein, according to the present invention.

The Sub-Terranean Updraft Tower Process Organization

The STUT System 14 has several key functional processes and elements which, according to the present invention, include:
  a. Air Resource
  b. Heat Resource
  c. Downdraft Air Inlet 11
  d. Outer Downdraft Sub-Terrestrial Shaft
  e. Inner Updraft Shaft
  f. VAVANT Airflow Turbine
  g. VAVANT Nozzle
  h. Upper Updraft shaft
  i. System Command & Controls The Outer Downdraft Sub-Terrestrial Shaft provides the physical containment and environment for the base and structural foundation of the STUT Tower 24. The Outer Downdraft Shaft Lining 17 is made of concrete, steel, or other rigid impermeable material; shaft depth and diameter are included among the contributors to the power generation capacity factors of the STUT process. Outer Downdraft Shaft Air Inlets 11 Ports & Dampers, control incoming air flow 12 into the Outer Downdraft Shaft 10 are provided by a continuous 360 degrees opening of air intake apparatus, located at the upper, above grade perimeter of the Outer Downdraft Shaft 10. The Outer Downdraft Shaft 10 houses an airflow control apparatus including dampers, louvers, openings, screen mesh, etc., and are located at, near, and/or above ground surface level 26. The Outer Downdraft Shaft 10 provides partial geothermal cooling of warm/hot air entering the shaft and is partially insulated, to counter the geothermal temperature gradient, in order to maintain control of, and sustain, relatively low or cool air temperatures of air mass flowing into and through the Outer Downdraft Shaft 10, regardless of climate or season. Both functions of Temperature Differentials and Pressure Differentials are initiated within the Outer Downdraft Shaft 10, with air mass arriving at the Transition Airflow 15 Zone 16, located at the bottom of the Outer Downdraft Shaft 10, cooler, denser, and of higher pressure than when it entered the Outer Downdraft Shaft 10.

The Inner Updraft Shaft lining 27 provides containment, mixing, and transfer of the conditioned airflow mass received from the Transition Airflow 15 Zone 16, at the bottom of the Outer Downdraft Shaft 10. It contains the Heat Exchanger 23 function and VAVANT Airflow Nozzle 30 and Turbine 31, and is housed or located within the Outer Downdraft Shaft 10. The Inner Updraft Shaft 20 is made of a strong, lightweight, impermeable material that partitions the Outer Downdraft Shaft 10 zone, and Inner Updraft Shaft 20 zone within the subsurface 18 regions of the system. The Inner Updraft Shaft 20 is a hollowed, truncated cone, or vertically oriented hollow conical frustum, with flared end downward, and tapered end upward, decreasing in diameter as the Inner Updraft Shaft 20 rises, approaching the VAVANT Airflow Turbine 31 orifice. This orientation has the effect of constraining air flow velocity, slightly decreasing air volume, while increasing pressure within the Inner Updraft Shaft 20, and the overall system pressure differentials.

As air approaches the VAVANT Airflow Turbine 31 orifice, it is at a relatively higher pressure than the ambient air pressure external to the system, or that is in the Outer Downdraft Shaft 10, or air that is in the Upper Updraft shaft 20 located above and downwind of the VAVANT Airflow Turbine 31 orifice. The VAVANT Airflow Nozzle 30 is part of the Inner Updraft Shaft 20 and functions to divert or spread, producing a 360-degree diversion of the vertical airflow stream, which is created within the Inner Updraft Shaft 20, into the VAVANT Airflow Turbine 31 inlets. The VAVANT Airflow Nozzle 30 has decreased the cross-sectional area of air flow, which increases the relative pressure, flow rate as the diverted, diverged air approaches the VAVANT Airflow Turbine 31 orifice. This VAVANT Airflow Turbine 31 orifice is a ring configuration, similar to the preferred, outer ring of performance within the outer edges, or radius of a typical Horizontal Axis Wind Turbine-HAWT Swept Area; not the less preferred single center opening that directs airflow onto turbine blades that occupy the center, lowest performing regions of a typical Horizontal Axis Wind Turbine-HAWT Swept Area. In addition to air, heat is the additional primary energy input into the STUT System 14. Heat 50 is brought into the system via heat exchangers 23 and working fluid from Heat Resources Options 54, derived from a plurality of heat resources, into the Inner Updraft Shaft 20. Achieving the previously described Outer Ring of Performance forms the basis of the function and orientation of the VAVANT Airflow Nozzle and Turbine, and supporting combination Downdraft/Updraft Tower of the STUT process, and is the primary focus of this invention The VAVANT Airflow Turbine 31 makes use of the Upward Air Flow and associated mass flow rate generated within the Inner Updraft Shaft 20. The STUT uses an air flow turbine seated at the apex of the Nested Converging-Diverging Semi-Ovular Nozzled 32 orifice and harnesses energy from the Heated Up Airflow 25 moving through the Inner Updraft Shaft 20 and VAVANT Airflow Nozzle orifice. VAVANT Airflow Nozzle 30 and Turbine 31 is made of light weight, high strength, durable materials that are connect via center located power shaft and mechanical gearbox. In an alternative configuration multiple power heads 33 are located at the perimeter of the VAVANT Airflow Turbine 31 Outer Ring, via mechanical power shaft apparatus. A plurality of VAVANT Airflow Turbine 31 related mechanical, electrical, electronic control, monitoring, and mechanisms are housed within the VAVANT Airflow Nozzle 30 to efficiently and reliably harness the airflow energy, and its conversion to mechanical, and electrical power output 37.

With STUT, a large and deep shaft of air will have greater mass and significantly higher relative air pressure than that at ground level. The relationship of the Inner Updraft Shaft 20 and Outer Downdraft Shaft 10 is unique and significant because the shafts' designed orientation create a constant taper effect of air volume as it air approaches the VAVANT Airflow Nozzle 30 and Turbine 31. This orientation creates a continuous decrease of the cross-sectional area as the air moves downward in the Outer Downdraft Shaft 10 and then upward within the Inner Updraft Shaft 20. The outer shaft is a true cylinder while the Inner Updraft Shaft 20 is a truncated cone, or conical frustum, with the taper down or decreasing diameter end closest to the VAVANT Airflow Nozzle 30 and Turbine 31. In this case, as air crosses the turbine and enters the Upper Updraft shaft 20, it slows dramatically. STUT enhances this natural stack effect by injecting heat the Upper Updraft shaft 20. This higher temperature, compared to the air temperature of the Inner Updraft Shaft 20, creates a pressure and volume difference. As the air approaches the exit opening or nozzle of the Inner Updraft Shaft 20, and crosses the VAVANT Airflow Turbine 31 orifice, the Venturi effect, caused by the orientation and configuration of the Nested Converging-Diverging Semi-Ovular Nozzled 30, causes mass flow rates and air velocity to increase, dramatically, at the ringed orifice.

The VAVANT AirFlow Nozzle 30 and Turbine 31 orifice of this System is not a single center hole that passes air in a single center-lined air stream, rather it is a shaped, contoured orifice is created by the use of a combination flared valve nozzle, that (produces a ring) passes high-speed air, at flow rates sufficient to the spin turbine. The actions or functions of the enhanced pressure differential across the orifice; per the Combined Gas Law, the achieved, pressure bias of the Upper Updraft shaft 20 and the Inner Updraft Shaft 20; Airflow, Volume displacement, and/or mass flow rates are directly proportional to the input/output ratio of the VAVANT Airflow Nozzle 30 and Turbine 31 orifice. This orientation has the effect of decreasing air volume. However the system experiences a significant increase in airspeed, according to the Bernoulli Equation. The Bernoulli Equation and Venturi Effect teaches that increased velocity is achieved at the choke point or apex of constrained fluid flow; the resultant pressure drop associated with deceleration of mass displacement across turbine blades. The VAVANT Airflow Nozzle 30 provides the function of constraining mass flow, increasing pressure and accelerating velocity and mass flow rates through the nozzle and across the VAVANT Airflow Turbine 31. The narrowing, diverging and converging of the orifice creates an orifice ring, harnesses the outer radius of Swept Area, and creates a performance ring that, unlike HAWT, that are designed across a range of air velocities, performs at a specific, controlled, tuned, optimized extremely high mass flow rate. The ideal system conditions leverage the variables of Pressure, Temperature, and Volume to create maximum pressure bias at the apex of the VAVANT Airflow Turbine 31, in accordance with the combined gas law; with the zone just above and downstream of the orifice possessing the lowest relative pressure within the system.

The Upper Updraft shaft 20 also provide for system air discharge and holds the STUT Air Discharge vents 41, louvers and covers which protects the system from debris and prevents foreign items from falling in the STUT from above. Establishing and sustaining a plurality of STUT System 14 pressure biases, creates and sustains high mass flow rates; which are included among the key contributors to the power generation capacity factors of the STUT System 14.

The designed diameter ringed orifice, nested VAVANT Airflow Nozzle configuration, and its cross-sectional area are included among the contributors to the power generation capacity factors of the STUT System 14; providing mass flow rates sufficient to create torque equal to larger traditional HAWT. STUT is a VAVANT Airflow Turbine 31, which creates, controls, and uses this High RPM, medium torque device to produce electrical power equal to HAWT, more efficiently in a smaller footprint.

The Upper Updraft Shaft's 20 specific function characteristics and profile are derived from the downwind airflow dispersion of the Beltz Ratio Flow Rate relation schematic, sourced from Sustainable Energy, (Tester, Drake, etc.). Within the STUT System 14, this updraft downwind zone of reduced airflow rate and low-pressure zone must be accounted for to reduce back pressure and turbine blade wake turbulence. The Upper Updraft Tower provides the crucial element of, and dimension for downwind air disbursement needed in any wind turbine, but especially with a non-organic wind turbine with STUT unique orientation. The Upper Updraft Shaft Lining 45 is a cowling, made of strong, lightweight, impermeable material that evacuates system air from STUT downwind chamber. Additionally, the Upper Updraft shaft 20 enhances overall system pressure differential, but providing communication of relatively high-pressure air mass with relatively low-pressure air mass, across the VAVANT Airflow Nozzle 30 and Turbine 31 orifice. The height and volume of the Upper Updraft Shaft 20 are included among the contributors to the power generation capacity factors of the STUT System 14. The Upper Shaft Vents system airflow and Covers 44 the STUT components.

As stated, the primary Heat Resource Option 54 for STUT in a Thermo-Electric Power Plant Hybrid configuration, is Power Plant waste heat 51. The preferred configuration is a full STUT, a non-hybrid configuration wherein Heat Resources 50 of Geothermal 52 Hot Dry Rock—HDR wells or Solar Thermal 53 Heat are utilized to provide fully renewable and emissions-free power generation to the Power Grid 56.

Operations of the Sub-Terranean Updraft Tower System

In accordance with the invention, there is provided a process that includes a Sub-Terrestrial Updraft Tower-STUT, which is a combination Downdraft/Updraft Tower airflow processes, that generates electrical power from the large volumetric displacements of air or other gases; driven by a plurality of sustained system pressure biases, and fed by temperature differentials that are initiated, sustained, and enhanced due of the configuration and orientations of the functions of numerous STUT process elements. The STUT process includes an Inner Updraft Shaft 20 vertical air shaft with nested Vertical Axis Vertical Airflow Nozzle and Turbine—VAVANT Airflow Turbine 31 assembly. The Inner Updraft Shaft 20 is oriented and housed within a deep, sub-terrestrial Outer Downdraft Shaft 10 which receives low-velocity downdraft air flow 13 from STUT System 14 Outer Downdraft Shaft 10 air inlets located at or near ground surface level 26; with airflow downward into a deep Outer Downdraft Shaft 10.

Once reaching the bottom of the Outer Downdraft Shaft 10, air flow reverses in direction, inward and upward, into the Inner Updraft Shaft Inlet 21 of the Inner Updraft Shaft 20 of the STUT. The STUT Up Air Flow 22 is induced and sustained via the injection of air into the Outer Downdraft Shaft 10, and heat into the contoured Inner Updraft Shaft 20 of the STUT, which creates a coherent and accelerated airflow; and approaches the contoured Vertical Axis Vertical Airflow Nozzle and Turbine—VAVANT Airflow Turbine 31 with relatively increased pressure and velocity; causing divergent converged airflow to pass through and within the contoured nozzle, and across the VAVANT Airflow Turbine 31 with high velocity and mass flow rate. The accelerated airflow causes rotation of the VAVANT Airflow Turbine 31, and the summation of torque forces present at the VAVANT Airflow Turbine 31 center hub and perimeter; within the attached gearing and power head 33; thus generating ENT and electrical power. The processes of initiating, inputting, gathering, collecting, controlling, aligning, orienting, conditioning, accelerating, transferring, exchanging, and mixing airflow mass with available heat into the airstream, optimizing exergy, and harnessing converted power from this technology is the focus and accomplishment of this invention. These and other major elements STUT provide the following processes related to STUT System 14 Organization and Operations, that support or provide beneficial functions and associated features described herein, according to the present invention.

STUT uses a larger diameter Outer Downdraft Shaft 10 to house and enclose a smaller diameter STUT Inner Updraft Shaft 20. STUT's unique design, utility, & orientation creates a combination Outer Downdraft Shaft 10/Inner Updraft Shaft 20 that cools & conditions a continuously descending air mass, creates a relatively lower temp, less buoyant air mass inside a subsurface 18 Outer Downdraft Shaft 10; and a higher temp, relatively more buoyant air mass inside a subsurface 18 Updraft Shaft/Tower 20. STUT uses the relatively large pressure differential between the surface and bottom of a deep shaft to charge the cooled air mass. STUT uses an Inner Updraft Tower/Outer Downdraft Shaft 10 transition to transfer downdraft airflow up and into STUT's—Inner Updraft Tower; where the pressure differentials between the bottom of a deep STUT shaft/tower, and top of Upper Shaft 40 are optimized. The Upper Shaft 40 outlet vents 41 are located above ground surface, and at higher elevation/s than the Outer Downdraft Shaft 10 air inlet elevation/s and provides exit ports for outgoing air flow 42. This elevation or height delta between the bottom of Inner Updraft Shaft 20 and the top of Upper Updraft shaft 20 creates substantial pressure bias which is enhanced by the transfer or injection of heat 55 from Heat Resources 50, to locations within the inside of the Inner Updraft Shaft 20. With this established and sustained pressure bias, the relatively buoyant air mass of relatively higher pressure and temperature continuously moves into the low pressure zone within the upper shaft 40 with high velocity and mass flow rate. The air mass of relatively higher pressure and velocity steadily moves across the VAVANT Airflow Turbine 31, after accelerating and crossing or passing through the apex 32 of a Nested Converging-Diverging Semi-Ovular Nozzled 30 (NCDSO), which is housed within the VAVANT Airflow Turbine 31 assembly.

STUT leverages the interdependence of the Pressure, Volume, and Temperature variables under the guidance of the Combined Gas Law, which states that: "The ratio between the pressure-volume product and the temperature of a system remains or attempts to remain constant." This law as stated is interpreted to say that with the existence of an imbalance of any one of the pressure, volume or temperature variables, one of the other variables will seek to re-establish a constant state of balance or equilibrium. STUT's processes and orientations of elements creates a configuration, containment, and environment of system conditions that establish and maintain system-wide pressure imbalances. between neutral pressure system locations, higher pressure system locations, and lower pressure system locations. Additionally, heat is introduced into the Inner Updraft Shaft 20 at depth, and drives the STUT System 14 Temperature differential into increased imbalance, creating a plurality of increased biases in Pressure and/or Volumetric displacement of air present in the system between Inner Updraft Shaft 20, Outer Downdraft Shaft 10, and Upper Updraft shaft 20. The high rate mass flow of air is harnessed by the VAVANT Airflow Turbine 31, as it attempts to reestablish ideal ratios and system balance. Sustaining this imbalance through the configuration and orientations of the functions of numerous STUT process elements creates controlled, stable, high volume, air flow displacement across STUT's VAVANT Airflow Turbine 31, to be harnessed as electrical power.

Per the Combined Gas Law, which is a gas law that is an amalgamation of three previously discovered and related laws, which combines Charles's law, Boyle's law, and Gay-Lussac's law. These laws each relate one thermodynamic variable to another mathematically while holding everything else constant. Charles's Law states that volume and temperature are directly proportional to each other as long as pressure is kept constant. Boyle's law asserts that pressure and volume are inversely proportional to each other at fixed temperature. Finally, Gay-Lussac's law introduces a direct proportionality between temperature and pressure as long as it is at a constant volume. The inter-dependence of these variables is shown in the combined gas law, which clearly states that:

$$\frac{pV}{T} = k$$

"The ratio between the pressure-volume product and the temperature of a system remains constant." This can be mathematically stated as, where:
p=pressure
V=volume
T=temperature
k is a constant (with units of energy divided by temperature). Therefore $$\frac{p_1 V_1}{T_1} = \frac{p_2 V_2}{T_2}$$

Within the STUT System 14, the plurality of Pressure, Volume, and Temperature combination variations and lack of equilibrium, once established within and throughout the system, feeds a continuous and sustained plurality of Pressure=p, Temperature=T, and Volume=V, or PVT non-equilibrium conditions. The Combined Gas Law equation chain, therefore, has a plurality of variable condition states as applied with STUT process, and therefore has applicability, continuity, and persistence throughout the STUT System 14, according to the present invention.

Comparing and/or seeking an equilibrium state with the performance of air under two or three different sets of conditions, or a plurality of system conditions and locations within the STUT System 14; the combined gas law, within a system with a plurality of locations and large volumetric conditions, can, according to the present invention, be extrapolated and or reinterpreted for a plurality of STUT System 14 conditions and locations; example L1, L2, L3, L4, etc., each with associated key variables of Pressure, Temperature, and Volume functions, expressed in FIG. 2 to be written as:

$$\frac{p1V1}{T1} = \frac{p2V2}{T2} = \frac{p3V3}{T3} = \frac{p4V4}{T4} = \text{etc.}$$

According to the present invention, system elements and functions create conditions; wherein stability or equilibrium are sought but never achieved. A plurality of dynamic imbalance within the STUT System 14 induces and sustains communication of volumetric forces present within air masses at Locations L1 to L2, at L2 to L3, at L3 to L4, and so on, and so forth. An example of the plurality of relative system conditions is thus:

L1. Surface Location 11, 26
  $P_1$—Neutral Relative Pressure
  $V_1$—Low Mass Displacements & Flow Rates
  $T_1$—Neutral Air Temperature
L2. Outer Downdraft Sub 13, 15
  $P_2$—Higher Relative Pressure
  $V_2$—Moderate Mass Displacement & Flow Rates
  $T_2$—Lower Relative Air Temperature
L3. Inner Updraft Shaft 25, 30
  $P_3$—Highest Relative Pressure
  $V_3$—Highest Mass Displacement & Flow Rates
  $T_3$—Highest Relative Air Temperature
L4. Upper Updraft Shaft 31, 42
  $P_4$—Lowest Relative Pressure
  $V_4$—Low Mass Displacement & Flow Rates
  $T_4$—High Relative Air Temperature Once given the above disclosure, many features, modifications, and improvements will become apparent to the skilled artisan. Such other features, modifications, and improvements are therefore considered to be a part of this invention, the scope of which is to be determined by the following processes. The features, functions, configurations, and orientations of STUT elements described herein, along with other aspects of the present invention will become apparent upon reading the detailed description in conjunction with the associated drawings. In general, the invention leverages mechanical advantages and functional synergies derived from a combination of engineering principles. Other features and advantages of the invention will be apparent from the following description, the figures, and from the claims presented, according to the present invention. While the aforementioned is a completed description of the embodiment of the invention, it should be evident that various modifications, alterations, alternatives, and equivalents may be made and used, Accordingly, the above description should not be taken as limiting the scope of the invention, which is defined by the metes and bounds of the appended claims.

What is claimed is:

1. A Sub-Terranean Updraft Tower for generating power, comprising:
   an outer downdraft shaft extending from a downdraft shaft top having a downdraft inlet orifice for air entry to a downdraft shaft bottom, the downdraft shaft top being positioned at or above grade and the downdraft shaft bottom extending deep enough below grade and configured to create a thermal sink within an upper portion of the outer downdraft shaft to cool the air entering through the downdraft inlet orifice;
   an inner updraft shaft concentrically located within the outer downdraft shaft, the inner updraft shaft extending from near the downdraft shaft bottom to an elevation higher than the downdraft shaft top and having an updraft inlet orifice in fluid communication with the outer downdraft shaft only at an airflow transition region located near the downdraft shaft bottom;
   an updraft tower supports an above grade portion of the inner updraft shaft with an updraft outlet orifice at or near a top of the updraft tower and houses a vertical axis vertical airflow wind turbine disposed in the inner updraft shaft, the vertical axis vertical airflow wind turbine configured to generate rotational velocity from moving air in the inner updraft shaft; and
   a heat source disposed in the inner updraft shaft configured to heat nearby air.

2. The Sub-Terranean Updraft Tower for generating power according to claim 1, wherein the heat source is a heat exchanger apparatus configured to draw heat from a second heat source located outside of the inner updraft shaft.

3. The Sub-Terranean Updraft Tower for generating power according to claim 1, wherein the vertical axis vertical airflow turbine comprises an annular opening through which air passes causing rotation in blades connected to a hub of the vertical axis vertical airflow turbine and to multiple perimeter located powerheads, each with a power shaft and a gearbox and attached to the hub and positioned adjacent to the annular opening.

4. The Sub-Terranean Updraft Tower for generating power according to claim 1, wherein blades of a hub of the vertical axis vertical airflow wind turbine are connected to a center located power shaft and gearbox.

5. The Sub-Terranean Updraft Tower for generating power according to claim 1, wherein multiple power heads are located at or near a perimeter of an annular opening of the vertical axis vertical airflow turbine, and connected via power_shafts.

6. The Sub-Terranean Updraft Tower for generating power according to claim 1, wherein the updraft tower comprises a cover zone of relatively low pressure.

7. The Sub-Terranean Updraft Tower for generating power according to claim 1, wherein the heat source is thermal electric power plant heat, a geothermal hot dry rock reservoir, process or waste heat, or a solar thermal heat.

8. The Sub-Terranean Updraft Tower for generating power according to claim 2, wherein the heat exchanger apparatus is located in the updraft tower downstream from the vertical axis vertical airflow turbine.

9. The Sub-Terranean Updraft Tower for generating power according to claim 1, wherein the inner updraft shaft functions as a heat energy transfer chamber.

10. The Sub-Terranean Updraft Tower for generating power according to claim 2, wherein the heat exchanger apparatus is located in the inner updraft shaft upstream from the vertical axis vertical airflow turbine.

11. The Sub-Terranean Updraft Tower for generating power according to claim 1, wherein an atmospheric pressure at the downdraft inlet orifice is higher than an atmospheric pressure at the updraft outlet orifice, the updraft outlet orifice having a higher elevation than the downdraft inlet orifice.

12. The Sub-Terranean Updraft Tower for generating power according to claim 1, wherein a mass of a column of air in the outer downdraft shaft is greater than a mass of a column of air in the inner updraft shaft for maintaining proper direction and flow rate of air in the inner updraft shaft.

13. The Sub-Terranean Updraft Tower for generating power according to claim 1, further comprising a nozzle in the inner updraft shaft upstream of the vertical axis vertical airflow wind turbine, the nozzle being centrally mounted in the inner updraft shaft and having a flared shape configured to function as a chokepoint forcing all of the air to the outer circumference of the inner updraft shaft as the air passes through the vertical axis vertical airflow wind turbine.

14. The Sub-Terranean Updraft Tower for generating power according to claim 13, wherein the nozzle is configured to increase air velocity and maximize mass flow rates at the chokepoint.

15. The Sub-Terranean Updraft Tower for generating power according to claim 14, wherein from a center axis of the inner updraft shaft, the flared shape is convex.

16. The Sub-Terranean Updraft Tower for generating power according to claim 14, wherein the nozzle is housed in a conical frustum shaped section of the inner updraft shaft that is narrower upstream and wider downstream, a widest point of the inner updraft shaft in the conical frustum shaped section prior to the chokepoint and a widest point of the nozzle separated by a gap that defines an annular opening at the chokepoint.

17. The Sub-Terranean Updraft Tower for generating power according to claim 16, wherein blades of the vertical axis vertical airflow wind turbine positioned proximate to the chokepoint are configured to rotate from the mass flow rates through the chokepoint.

18. The Sub-Terranean Updraft Tower for generating power according to claim 1, wherein maximum air pressure in the system is located at the air flow transition region.

19. The Sub-Terranean Updraft Tower for generating power according to claim 1, wherein an upper portion of the inner updraft shaft is tapered inward relative to a bottom portion of the inner updraft shaft.

20. The Sub-Terranean Updraft Tower for generating power according to claim 16, wherein the inner updraft shaft tapers from the updraft inlet orifice inward into the conical frustum shaped section of the inner updraft shaft.

* * * * *